July 14, 1953     G. D. PICKERING     2,645,374
FASTENER ATTACHING MACHINE
Filed Feb. 8, 1947     12 Sheets-Sheet 1

Inventor
GEORGE D. PICKERING,
By John Todd
Attorney

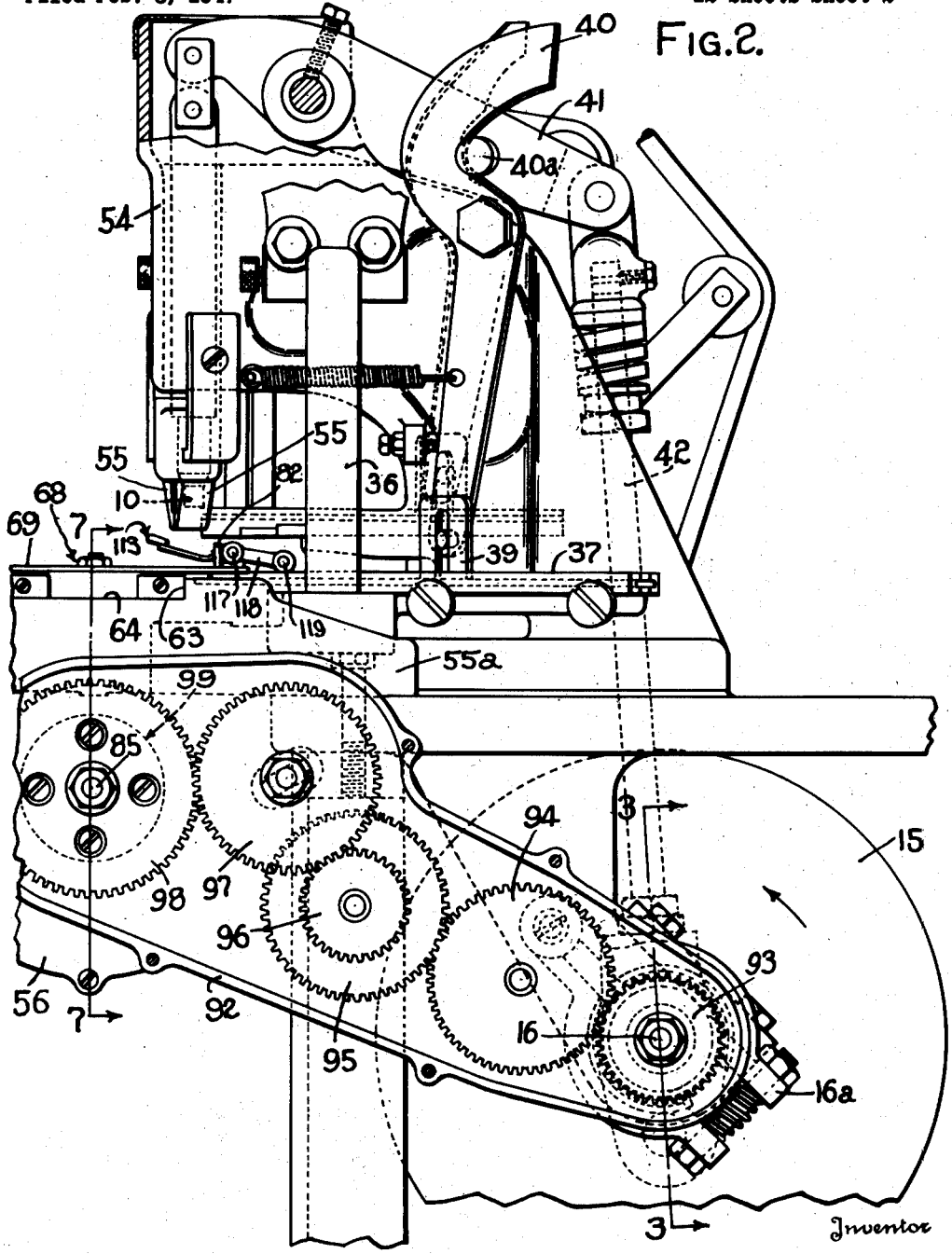

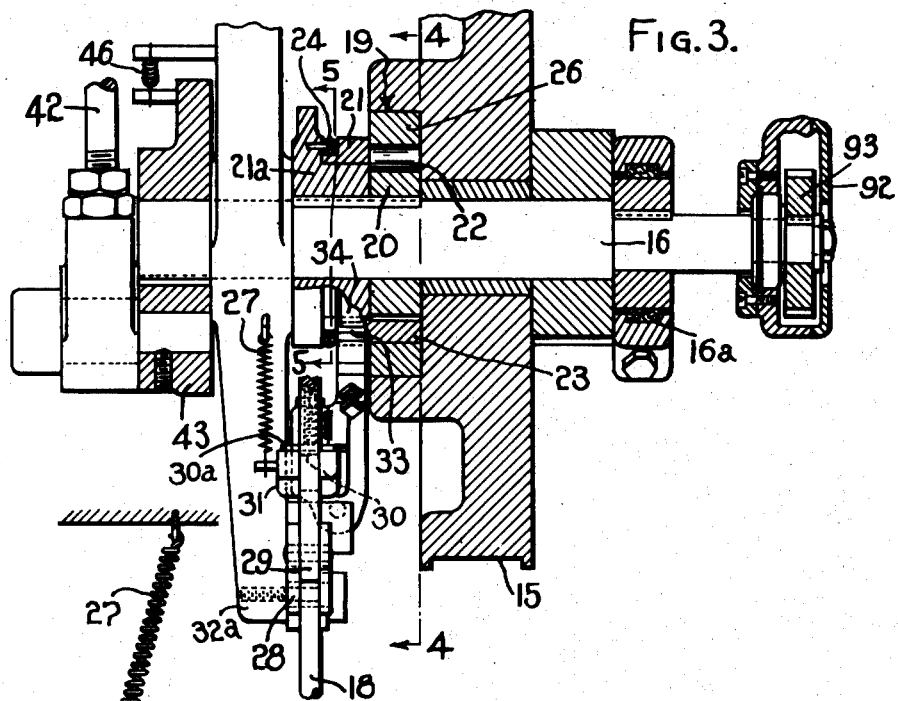
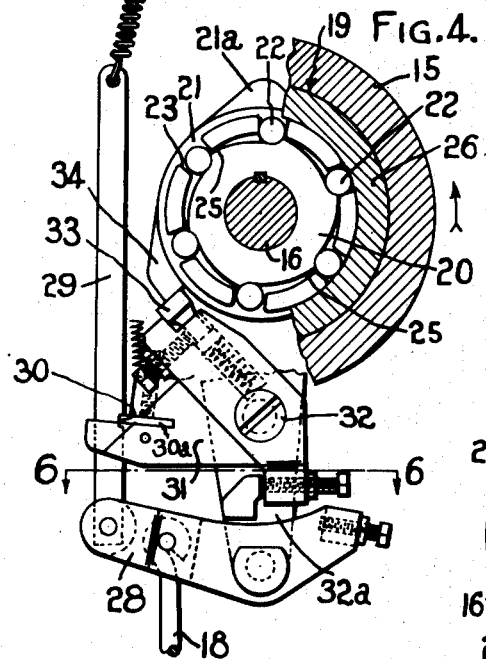
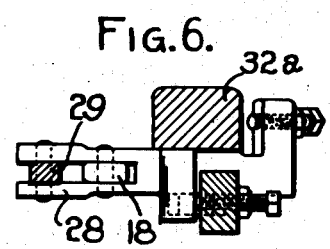
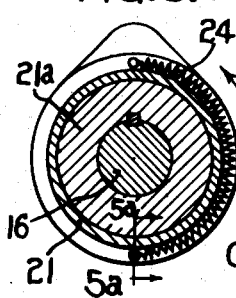
Inventor
GEORGE D. PICKERING,
By John Todd
Attorney July 14, 1953 G. D. PICKERING 2,645,374
FASTENER ATTACHING MACHINE
Filed Feb. 8, 1947 12 Sheets-Sheet 4
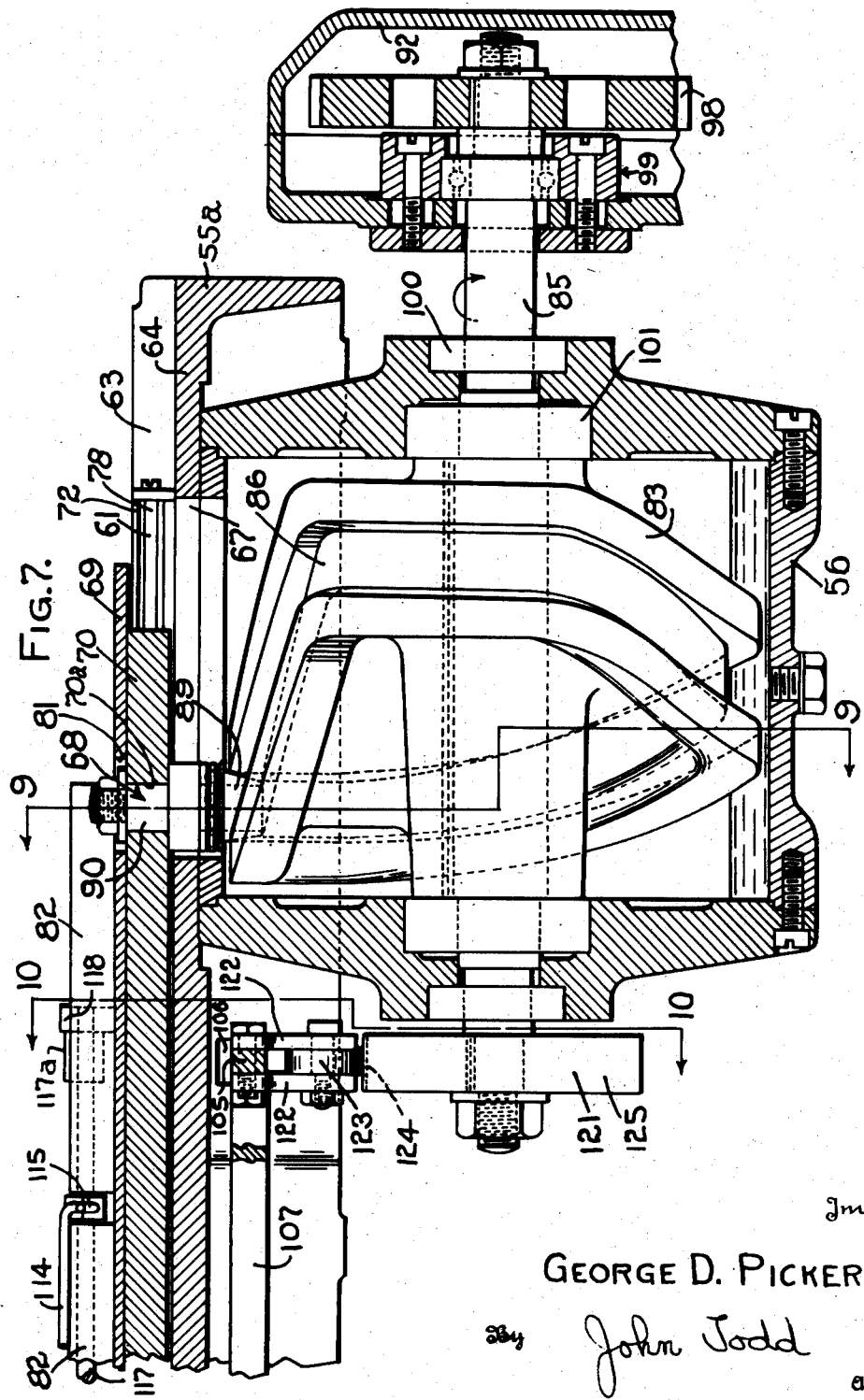
Inventor
GEORGE D. PICKERING,
By John Jodd
Attorney July 14, 1953  G. D. PICKERING  2,645,374
FASTENER ATTACHING MACHINE
Filed Feb. 8, 1947  12 Sheets-Sheet 5

Inventor
GEORGE D. PICKERING,
By John Todd
Attorney

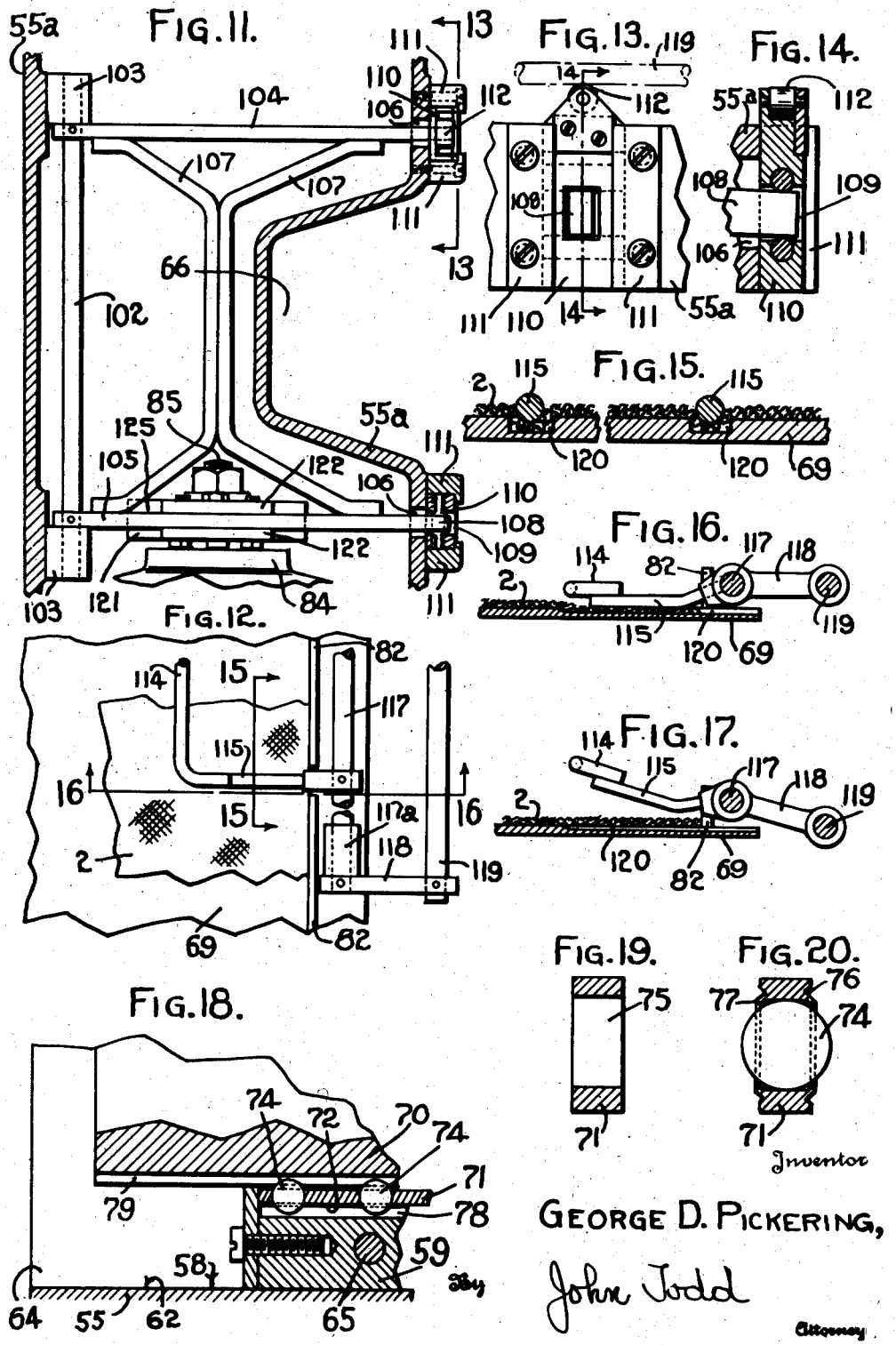

July 14, 1953 — G. D. PICKERING — 2,645,374
FASTENER ATTACHING MACHINE
Filed Feb. 8, 1947 — 12 Sheets-Sheet 7

Inventor
GEORGE D. PICKERING,
By John Todd
Attorney

July 14, 1953  G. D. PICKERING  2,645,374
FASTENER ATTACHING MACHINE
Filed Feb. 8, 1947  12 Sheets-Sheet 8
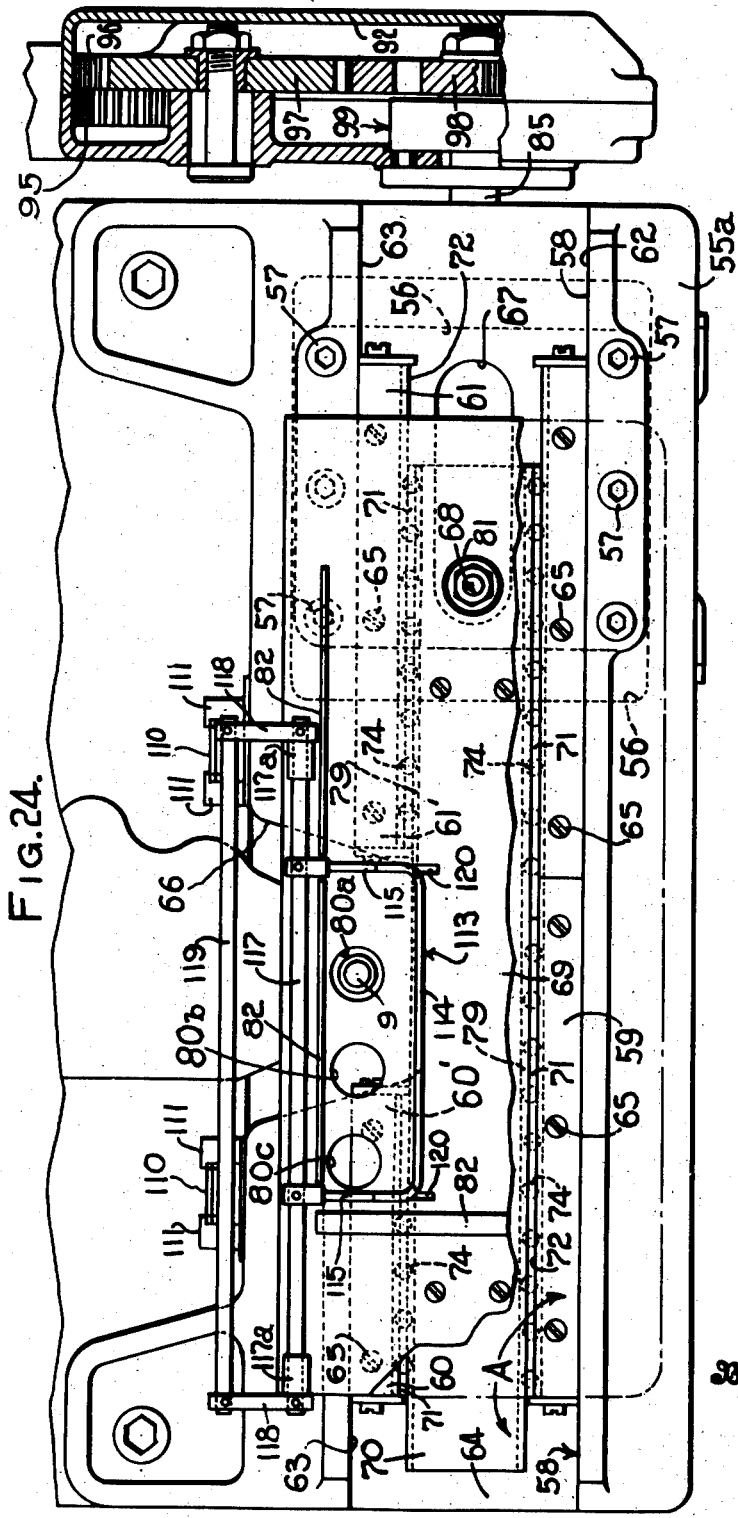
Inventor
GEORGE D. PICKERING,
By John Todd
Attorney July 14, 1953
G. D. PICKERING
2,645,374
FASTENER ATTACHING MACHINE
Filed Feb. 8, 1947
12 Sheets-Sheet 9
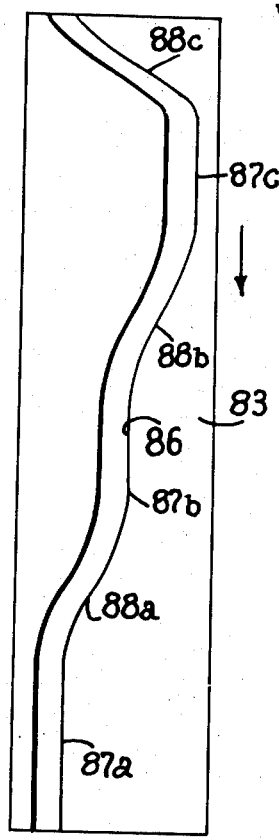
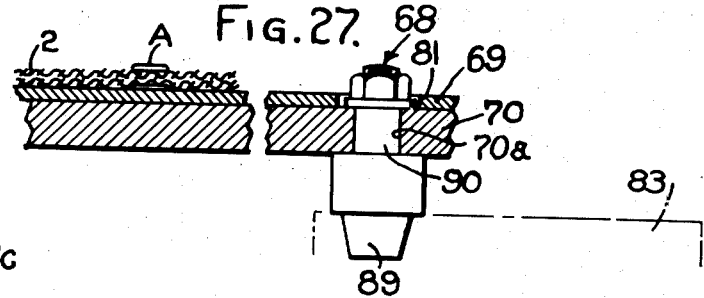
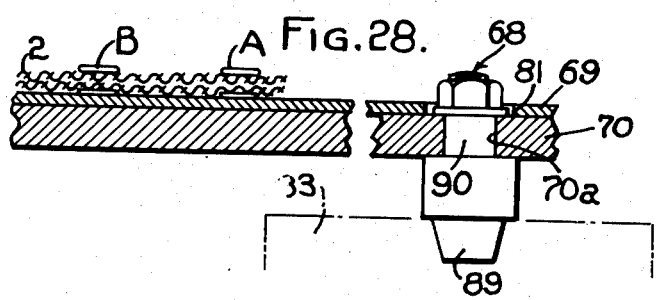
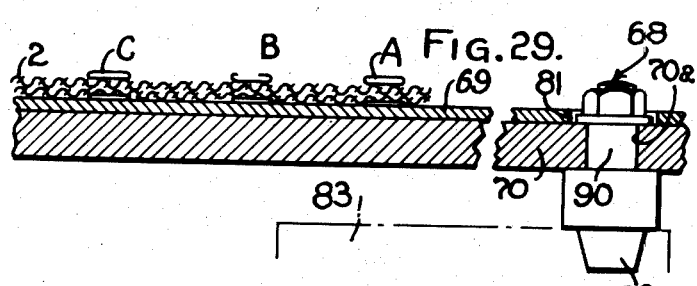
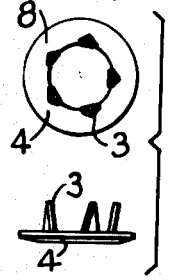
Inventor
GEORGE D. PICKERING,
By John Todd
Attorney July 14, 1953  G. D. PICKERING  2,645,374
FASTENER ATTACHING MACHINE
Filed Feb. 8, 1947  12 Sheets—Sheet 10
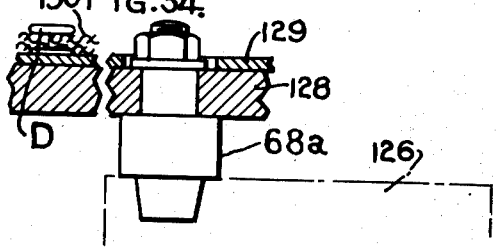
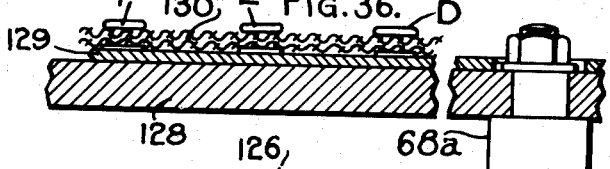
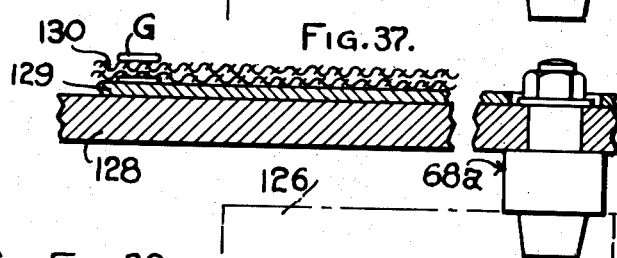
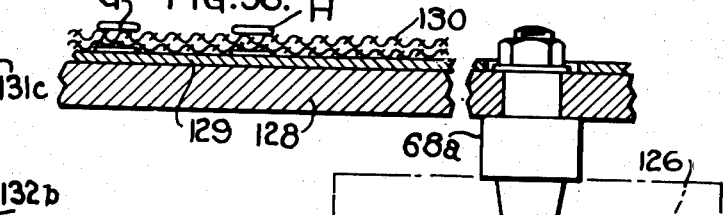
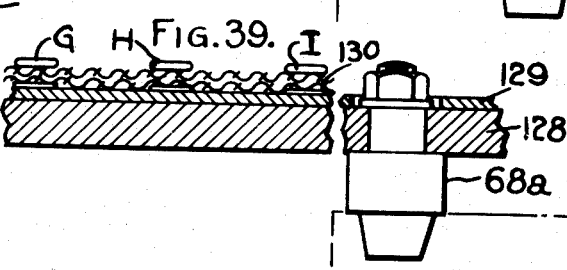
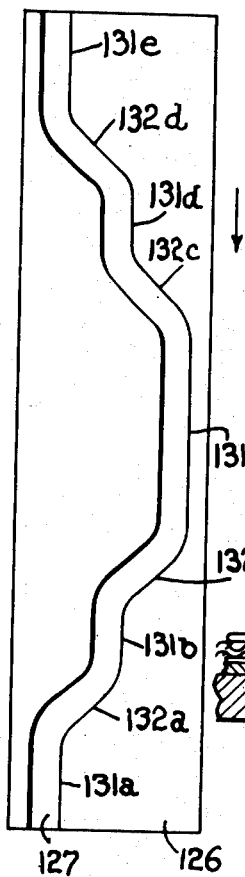
Inventor
GEORGE D. PICKERING,
By John Todd
Attorney

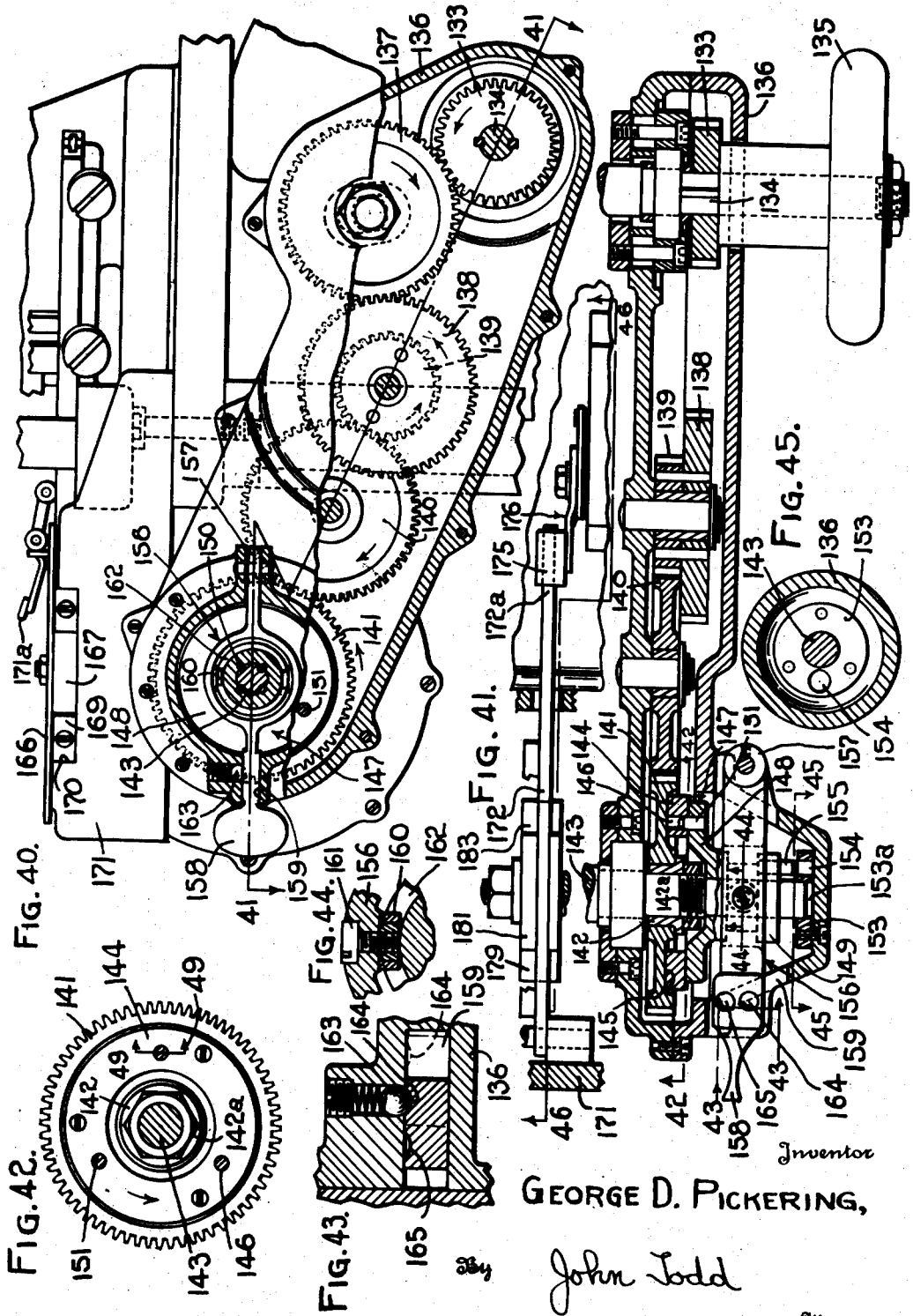

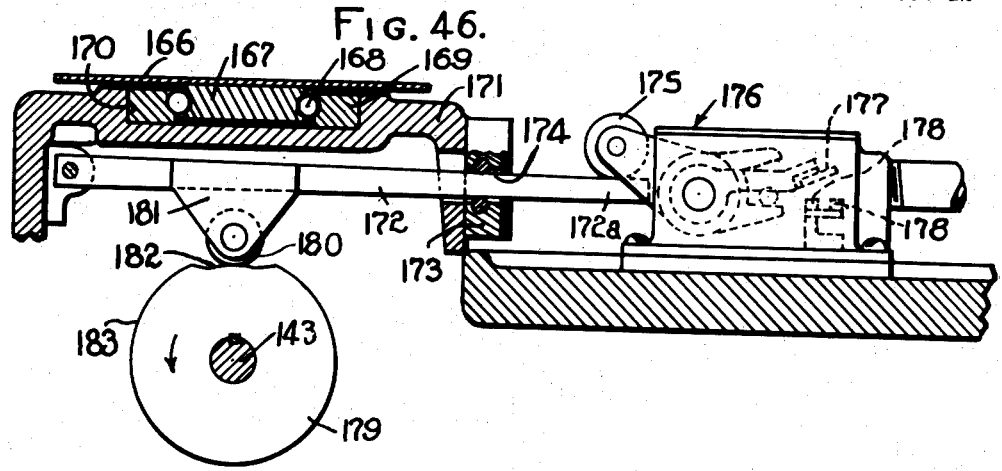
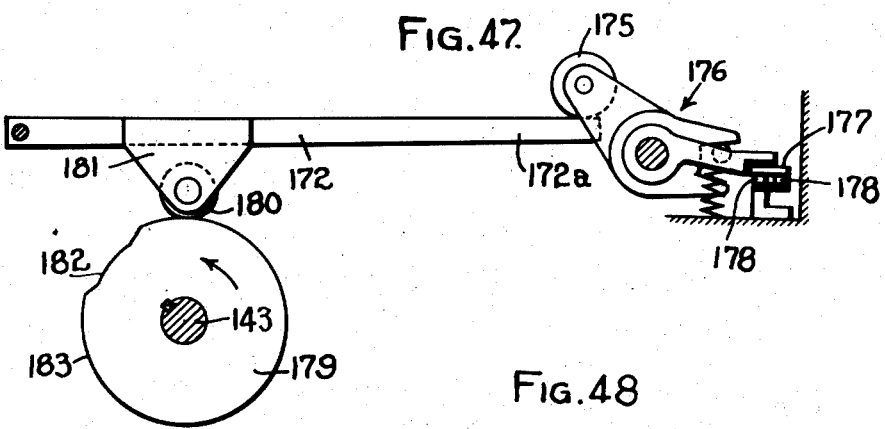
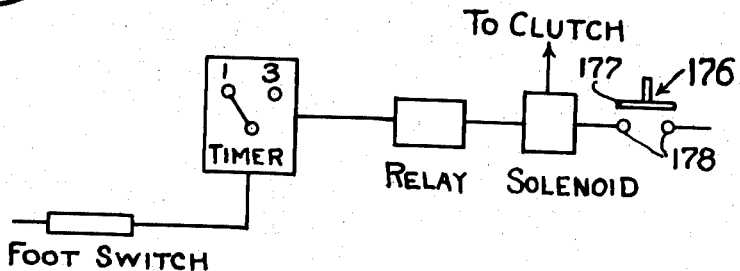
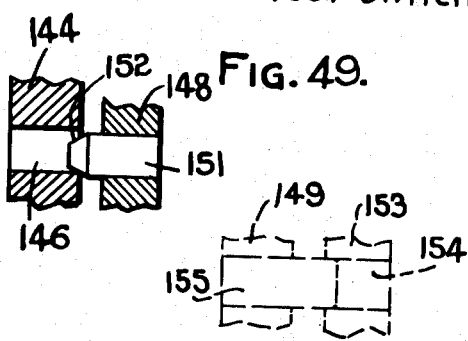

Patented July 14, 1953

2,645,374

UNITED STATES PATENT OFFICE 2,645,374

FASTENER ATTACHING MACHINE

George D. Pickering, Dorchester, Mass., assignor to United-Carr Fastener Corporation, Cambridge, Mass., a corporation of Massachusetts Application February 8, 1947, Serial No. 727,461

6 Claims. (Cl. 218—6)

This invention relates to fastener attaching machines of the type generally known as "automatic" attaching machines in which fasteners are fed to setting mechanism which attaches the fasteners to a work arranged to be moved desired distances to space properly the fasteners which are set thereon.

The object of this invention is the provision of an automatic machine of the type set forth wherein a work supporting table is mounted for reciprocal movement between upper and lower fastener setting tools and wherein a simple and efficient mechanism is provided for imparting an intermittent movement to the table in synchronized relation with the fastener-setting mechanism whereby a predetermined number of fasteners may be set during the course of the intermittent movement of the work-supporting table.

Another object of my invention is the provision of an automatic setting machine of the type wherein a number of fasteners may be attached to a work moving intermittently so as to space properly the fasteners with the machine constructed so that the mechanism for moving the work may be thrown out of action to enable the setting mechanism to apply fasteners singly to the work.

A further object of my invention relates to a novel method of clamping the work to a supporting plate during setting of the fasteners so that the work is held tightly and stretched to prevent wrinkling thereof when the fasteners are applied.

Other objects of my invention will be apparent from inspection of the drawings and specification hereinbelow set forth.

The drawings illustrate generally the construction of the complete attaching machine device, but they particularly show the methods of effecting the indexing feature enabling a predetermined number of fasteners to be applied in proper position to a moving work.

Referring to the drawings:

Fig. 2 is a side elevation taken on the line 2—2 of Fig. 1;

Fig. 3 is a section taken on the line 3—3 of Fig. 2;

Fig. 4 is a section taken on the line 4—4 of Fig. 3;

Fig. 5 is a section taken on the line 5—5 of Fig. 3;

Figure 8:
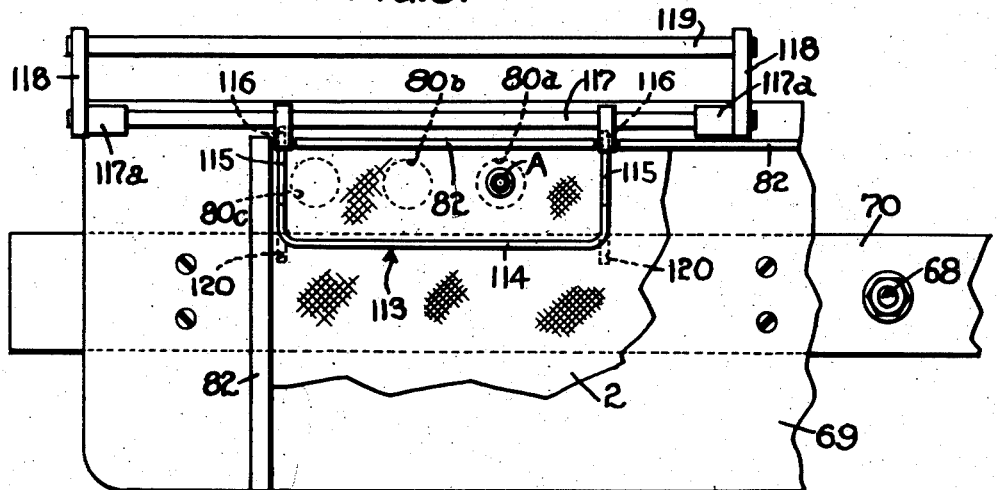
Figure 9:
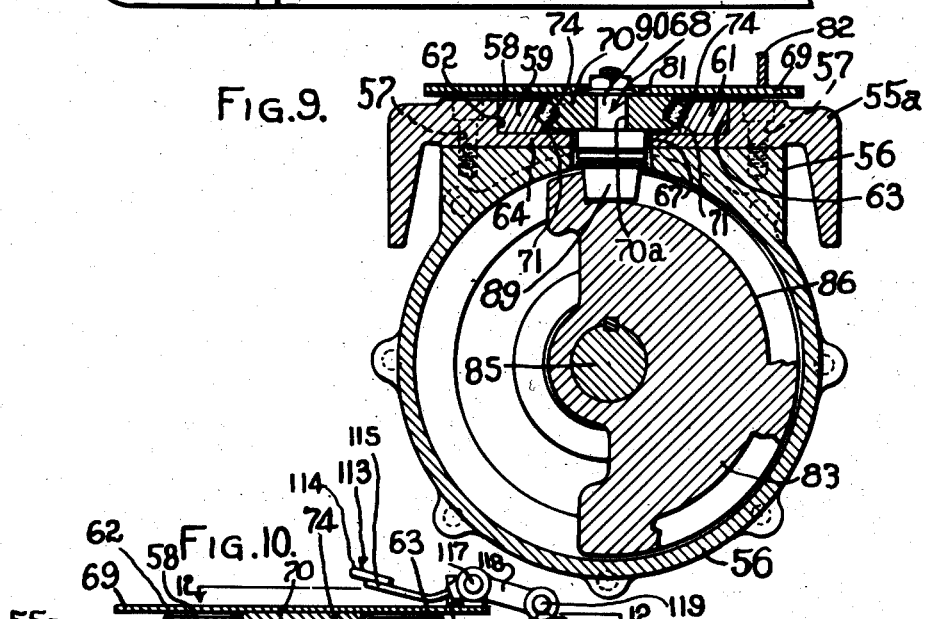
Figure 10:
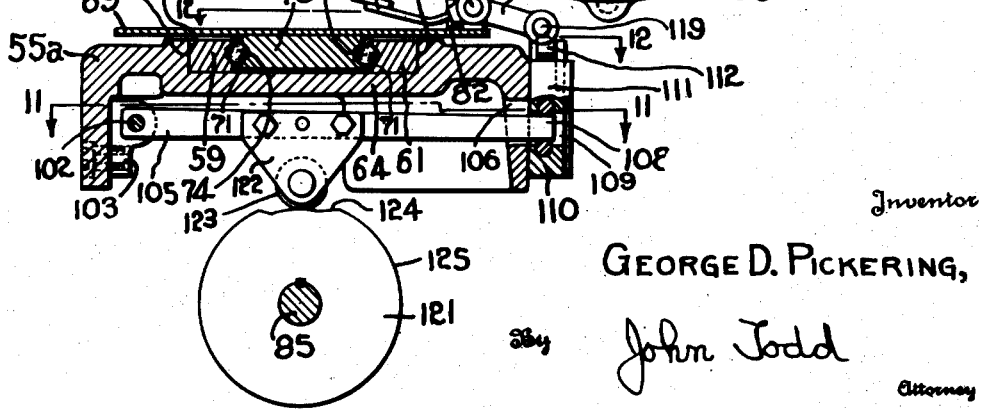
Figure 21:
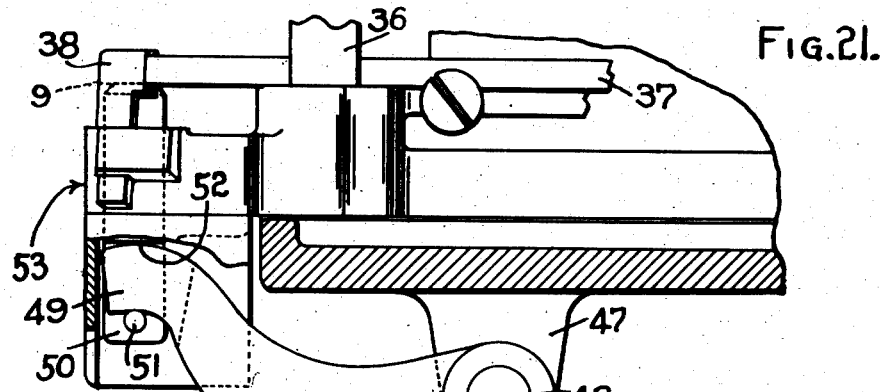
Figure 22:
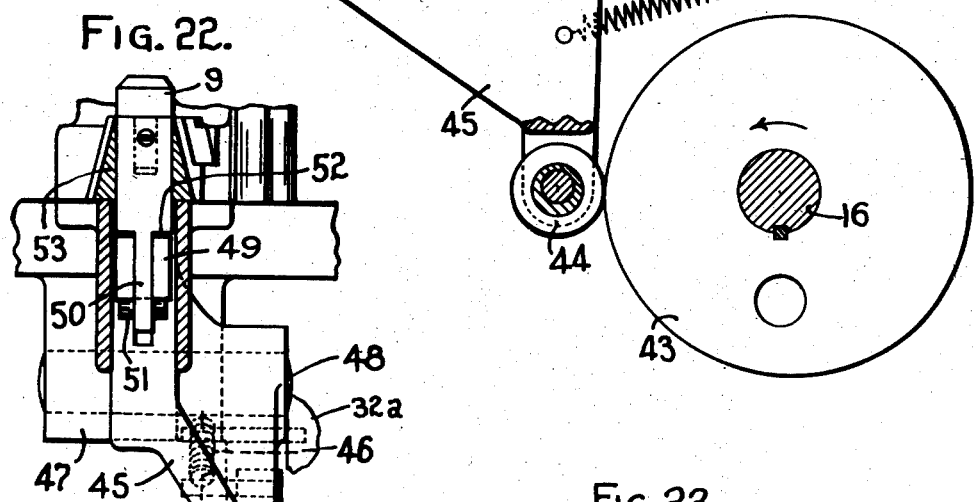
Figure 23:
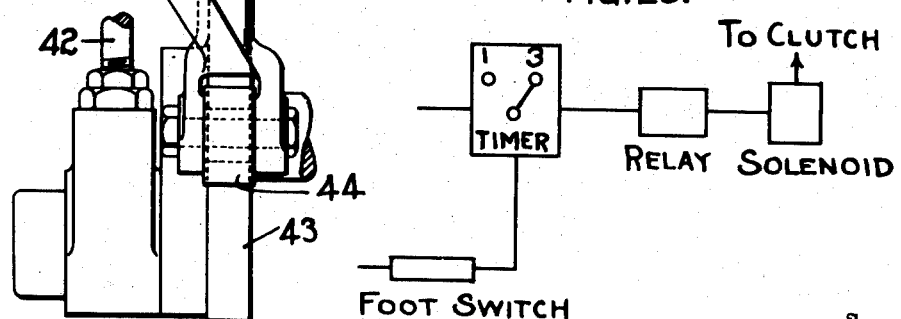

Fig. 5ᵃ is a section taken on the line 5ᵃ—5ᵃ of Fig. 5;

Fig. 6 is a section taken on the line 6—6 of Fig. 4;

Fig. 7 is a section taken on the line 7—7 of Fig. 2;

Fig. 8 is a plan of the work-supporting table showing the work in position against guides;

Fig. 9 is a section taken on the line 9—9 of Fig. 7;

Fig. 10 is a section taken on the line 10—10 of Fig. 7;

Fig. 11 is a sectional elevation taken on the line 11—11 of Fig. 10;

Fig. 12 is a section taken on the line 12—12 of Fig. 10;

Fig. 13 is an elevation taken in the direction of the line 13—13 of Fig. 11;

Fig. 14 is a section taken on the line 14—14 of Fig. 13;

Fig. 15 is a section taken on the line 15—15 of Fig. 12 showing the work-clamping bars in clamping position;

Fig. 16 is a section on the line 16—16 on Fig. 12 showing the clamping mechanism in clamping position;

Fig. 17 is a section similar to Fig. 16 showing the clamping mechanism in released position;

Fig. 18 is an enlarged portion of the table shown at A in Fig. 24 partly in section to illustrate the ball slide mounting;

Fig. 19 is an enlarged section through the ball holder;

Fig. 20 is a section through the ball holder showing the method of maintaining the ball in place;

Fig. 21 is a section showing the method of lifting the lower setting tool;

Fig. 22 is an elevation partly in section of the mechanism shown in Fig. 21;

Fig. 23 is a schematic wiring diaphragm for operating one form of my improved machine;

Fig. 24 is a plan of the work supporting table partly broken away;

Fig. 25 is a section through the table showing the work-clamping mechanism;

Fig. 26 is a chart of a cam path for automatic attachment of three fasteners;

Figs. 27, 28, and 29 are schematic sections showing position of cam during the fastener setting operation;

Fig. 30 is a section showing upper and lower setting tools operating to set one form of fastener member;

Fig. 31 illustrates front and side elevations of the preferred type of socket member illustrated in Fig. 30;

Fig. 32 illustrates front and side elevations of the attaching member preferably used for attaching the socket member of Fig. 31;

Fig. 33 is a cam chart illustrating the setting of six fasteners;

Figs. 34 to 39 illustrate the positions of the cam and fasteners in the operation in which six fasteners are set;

Fig. 40 is a side elevation partly in section of a second form of my invention;

Fig. 41 is a section on the line 41—41 of Fig. 40 partly in elevation;

Fig. 42 is a section on the line 42—42 of Fig. 41;
Fig. 43 is a section on the line 43—43 of Fig. 41;
Fig. 44 is a section on the line 44—44 of Fig. 41;
Fig. 45 is a section on the line 45—45 of Fig. 41;
Fig. 46 is a section on the line 46—46 of Fig. 41;

Fig. 47 is a diagrammatic view of some of the parts shown in Fig. 46;

Fig. 48 is a schematic wiring diagram for operating the second form of my attaching machine; and Fig. 49 is a diagrammatic view taken on the line 49—49 of Fig. 42 showing relative position of the clutch locking pins.

While my attaching machine will operate to set various forms of fasteners, the fastener elements illustrated in Figs. 31 and 32 exemplify the general type of fastener with the setting of which the present invention is particularly concerned. The part 1 shown in Fig. 31 is the socket element of a complete snap fastener device, but it could as well be the stud part (not shown) of the device which is engageable with the yieldable segmental portions of the socket. The socket element is set by disposing it upon one side of a garment or work 2 as shown in Fig. 30 and by then driving the attaching prongs 3 of a ring-like attaching member 4 through the work from the opposite side against the flaring apron 5 of the element 1 to turn them outwardly into the retaining ring 6 to clamp the work firmly between the flange 7 of the element 1 and the peripheral back portion 8 of the member 4. It will be understood that during this setting action the attaching member 4 is supported by the lower setting tool 9 which is brought upwardly to cooperate with the descending upper tool 10 carrying the socket element 1 as shown in Fig. 30.

Machines for carrying out the foregoing setting operation where the attachment is of a single or "semi-automatic" type are well known and the operational mechanism of the machines of my present invention is similar in much of its constructional details to these old machines. The basic operating mechanism of my present machines is to a great extent old in the art and while it is illustrated in the drawings in more or less detail, I shall describe it generally rather than specifically, but with sufficient clarity to enable persons skilled in the art to understand its correlation with the new features which are coordinated and synchronized with the old and fundamental parts to effect the automatic attaching and indexing sequences which are the objects of my invention.

Figure 1:
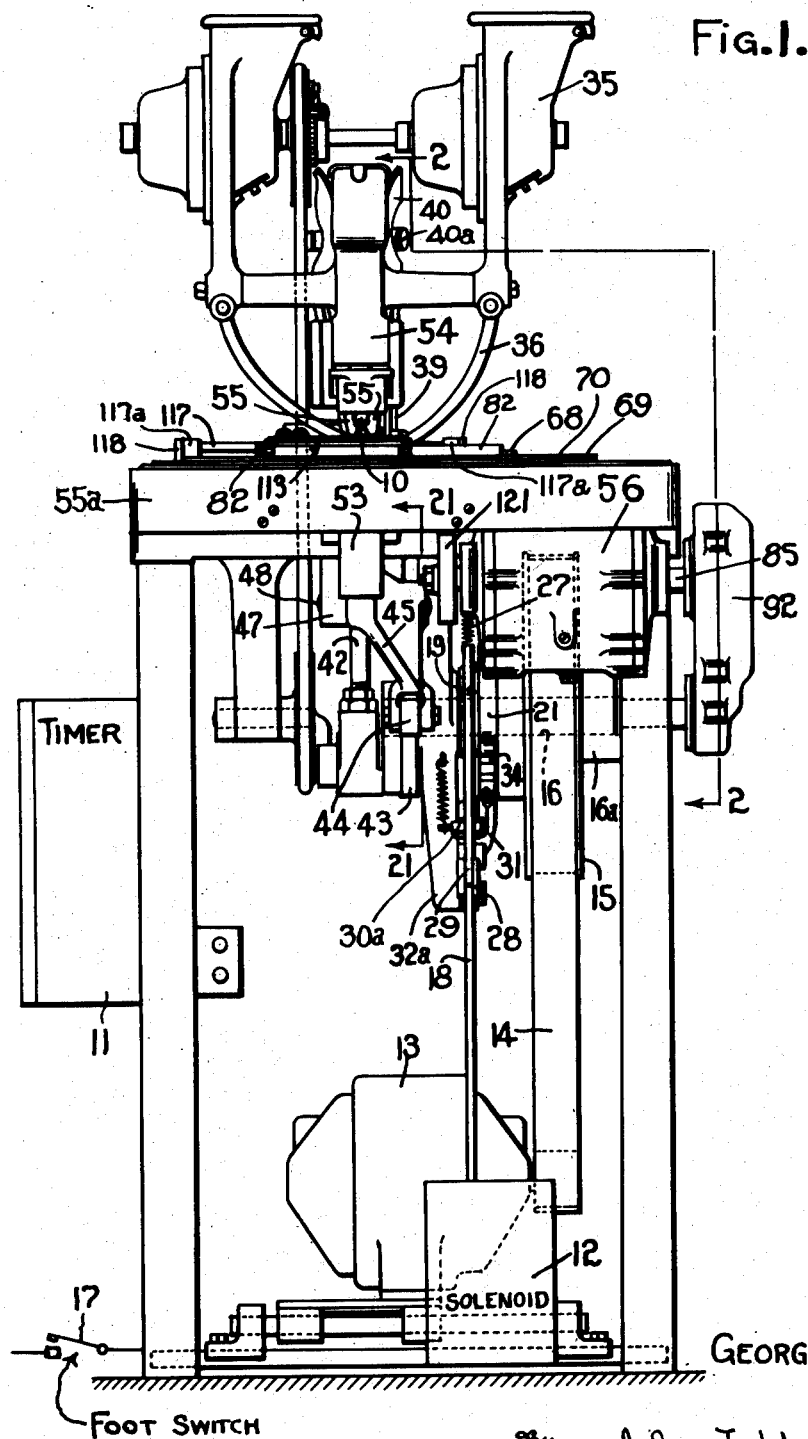
Fig. 1 is a front elevation of an attaching machine embodying my improvements.

The basic operational mechanism of my machine includes an electric timing switch 11 which as illustrated in the schematic wiring diagram of Fig. 23 is tied in with a solenoid device 12. The machine is started by switching on an electric motor (not shown) housed at 13 (Fig. 1) which drives the belt 14 to rotate the flywheel 15 normally rotating freely on the machine's main drive shaft 16. Operation of the foot switch 17 energizes the solenoid 12 through the timing switch 11 which may be set manually to attach one fastener semi-automatically or three fasteners automatically by the operation to be hereinafter described. In order to understand the automatic operation of the machine the parts will be described as operating with the timing switch positioned for the automatic setting of three fasteners. When the timing switch is closed the solenoid is energized thereby drawing the rod 18 downwardly which operates the clutch 19.

The clutch 19 which is shown in disengaged detail in Figs. 3–6 is preferably of the well known Horton type and operates in the following manner. A cam 20 is keyed to the driveshaft 16 (Fig. 4) and a clutch ring 21 is mounted to turn loosely on the cam member 21$^a$ which is keyed to the shaft 16. A series of rollers 22 are held loosely in slots 23 of the ring 21. A spring 24 (Fig. 5) acts on the ring 21 causing it to turn so as to carry the rollers 22 from low positions shown in Fig. 4 toward the high points 25 of the cam 20. When the rollers 22 reach a point about halfway between the lowest and highest points of the cam 20 they contact the hardened ring 26 of the flywheel 15 to lock the clutch to the flywheel 15. The actuating rod 18 is linked to a spring 27 through the links 28 and 29 (Fig. 4). The link 29 has a slot 30 receiving a lug element 30$^a$ of a part 31 which is pivoted at 32 to the support 32$^a$. When the rod 18 is pulled downwardly by the operation of the solenoid the stop element 33 is released from engagement with the lug element 34 carried by the clutch ring 21 through force applied to the lug 30$^a$ by the lever 29. This will permit rotation of the clutch ring 21 under the force of the spring 24 to engage the clutch with the flywheel 15. In releasing the clutch at the termination of the time interval controlled by the time switch and solenoid, the rod 18 is returned to normal position causing the element 33 to abut the lug 34 carried by the clutch ring 21 which causes the rollers 22 to be thrown out of engagement with the ring 26 to allow the flywheel 15 to rotate freely.

The upper and lower setting mechanisms may be of the form illustrated which is well known to those skilled in the art.

The delivery mechanism for the lower setting tool includes a hopper 35 of any suitable construction adapted to deliver fastener members to a chute 36 having its lower end terminating in the side of a track 37. The fasteners are moved forward to the lower jaws 38 (Fig. 21) by means of a slide member 39 operating in the track 37 (Fig. 2). The slide member is operated by a lever 40 which is actuated by a cam roll 40$^a$ attached to the rocker arm 41 which has one end connected to the connecting rod 42 (Fig. 2). The delivery mechanism for the upper setting tool is substantially identical and as it is not a novel feature of my present invention, will not be described.

A preferred mechanism for operating the lower setting die is shown in Figs. 21 and 22. This mechanism is actuated by an eccentric cam 43 keyed to the drive shaft 16. A roll 44 pivoted to an end of the lever 45 is maintained in contact with the cam 43 by the spring 46. The lever 45 is pivoted to the base 47 of the machine as at 48 in Fig. 21. The end 49 of the lever 45 is slotted to receive the tongue 50 of the lower setting tool 9 and is disposed between the pin 51 and the shoulders 52 of the tool. The tool is slidably mounted in the guide 53 in correlation with the lower jaws 38 and reciprocated by the cam 43 operating upon the lever 45.

The upper setting tool 10 is linked to the rocker arm 41 (Fig. 2) so that on upward motion of the crank shaft 42, the tool 10 which is slidably mounted in the frame 54 will force the upper jaws 55 apart to release the socket member which by this time is in contact with the work placed between the upper and lower jaw members. All of the movements of the upper and lower setting mechanisms and delivering mechanisms are in proper timed relation so that the fastener parts are properly gripped by their respective holding jaws at the time the tools move toward each other for the setting operation. In the operating mechanism shown in the drawings the setting and delivering parts are correlated with the driving mechanism in such a way that one fastener is set upon each rotation of the driveshaft 16.

Mechanism for moving the work with relation to the setting tools to effect the automatic attachment of a series of fasteners is shown in Figs. 7–10 and Fig. 24. This mechanism includes the machine headframe 55a which is bolted to the cam housing 56 by screws 57. The frame 55a has a channel 58 extending lengthwise thereof in which are assembled the guide members 59, 60, and 61. The guide member 59 which may be in two sections disposed in end to end relation extends along substantially the entire length of the channel 58 adjacent the wall 62 of the frame 55a. The guide members 60 and 61 extend along the opposite wall 63 of the frame 55a but are disposed with their inner ends 60' and 61' in spaced relation intermediate the ends of the frame 55a as most clearly shown in Fig. 24 to permit the lower setting tool 9 to move upwardly therebetween. The guide members 59, 60, and 61 are secured to that portion of the frame 55a which forms the bottom wall 64 of the channel 58 by screws 65 (Fig. 24). The frame 55a has an opening 66 therein disposed substantially in alignment with the opening between the ends 60' and 61' of the guide members 60 and 61 to receive the lower setting tool 9 in its upward motion. The frame 55a also provides an opening 67 (Fig. 24) in the wall 64 thereof through which extends the cam stud 68 the operation of which will be hereinafter described.

The work-supporting part on which the fasteners are to be set comprises a plate part 69 disposed to move reciprocally between the upper and lower setting tools. The plate 69 is bolted to a reciprocally movable supporting table 70 positioned in the channel 58 between ball bearing retainer strips 71 assembled adjacent the inner side walls 72 of the guide members 59, 60, and 61 as most clearly shown in Figs. 10 and 18. The ball bearings 74 are secured within openings 75 (Fig. 19) of the retainer strips 71 so as to rotate freely relative thereto by staking the strips at points 76 (Fig. 20) adjacent opposite sides of the openings to deform the metal as at 77 (Fig. 20) to embrace the bearings. In operation of the table to move the plate through the sequence of setting positions, the table is slidable freely between the ball bearings 74 which are retained within the slots 78 in the sidewalls 72 and the slots 79 on the sides of the table member as most clearly shown in Figs. 18 and 24. The plate 69 has three openings 80a, 80b, and 80c (Fig. 24) for receiving the lower setting tool during the fastener setting operation and an opening 81 (Figs. 7 and 9) for receiving the cam stud 68.

Gage stops 82 (Fig. 24) are preferably mounted on the upper surface of the plate 69.

Spacing mechanism for imparting the reciprocal intermittent movement to the table 70 and plate 69 in synchronization with the fastener setting mechanism includes a feed cam 83 disposed within a housing 56 which is secured to the frame of the machine adjacent the head. The cam 83 is keyed to a cam shaft 85 which is driven by an operating mechanism to be described. The cam 83 has a path 86 in its periphery (Figs. 7 and 9) which, as illustrated in Fig. 26, consists of a sequence of rests 87a, 87b, and 87c and a sequence of indexing throws 88a, 88b, and 88c. A cam roll 89 is disposed in the cam path 86 and is arranged to rotate upon the cam stud 68 which in turn extends through the opening 67 of the wall 64, the opening 70a of the table 70 and the opening 81 of the plate 69. Motion is imparted by the cam stud 68 to the table 70 by the stem 90 of the cam stud disposed within the opening 70a for engagement with the walls surrounding the same as most clearly shown in Fig. 7 and Figs. 27–29.

Mechanism for driving the cam shaft preferably includes a series of gears disposed within the gear casing 92 and formed and arranged to effect a three to one ratio whereby three revolutions of the drive shaft 16 will turn the cam shaft 85 one revolution. The gear mechanism includes a drive gear 93 keyed to the drive shaft 16 as most clearly shown in Figs. 2 and 3. The gear 93 meshes with an idler gear 94 (Fig. 2) which meshes with another idler gear 95 carrying the pinion 96. The pinion 96 meshes with an adjustably mounted idler gear 97 which in turn meshes with the cam shaft driving gear 98 which is keyed to the cam shaft 85 as most clearly shown in Fig. 7. The cam shaft 85 extends from the gear 98 to the feed cam 83 through an adjustable ball bearing housing 99 and grease retainer 100 and bearing 101 assembled within the end of the cam housing nearest the gear 98.

Correlated with the spacing mechanism is a clamping mechanism adapted to engage and hold the work during the setting operations so that wrinkles and puckers will not be formed in the material surrounding the fasteners. This mechanism is driven in synchronization with the reciprocal intermittent movement of the plate supporting table by the cam shaft 85. The mechanism comprises a pivotal rod 102 (Fig. 11) having its ends journalled in bearings 103 secured to the underside of the frame 55a. Spaced arms 104 and 105 are secured to the rod 102 and extend in directions normal to the rod through openings 106 in the underside of the frame. The openings 106 are large enough with relation to the dimensions of the arms to permit the arms to oscillate in an up and down direction. Frame elements 107 (Fig. 11) may extend between the arms 104 and 105 to strengthen the mechanism. The respective free ends 108 of the arms 104 and 105 extend through openings 109 in slide blocks 110. The slide blocks are assembled within channel members 111 secured to the outer side of the frame member 55a for up and down movement within the channels in directions normal to the arms 104 and 105. Rolls 112 are secured to the slide blocks at the upper ends thereof. That part of the clamping mechanism which engages the work to hold the same during the setting operations is disposed above the plate 69 and preferably comprises a clamping element 113 (Fig. 8) having a long supporting arm 114 and shorter clamping arms 115—115 which extend from the ends of the arm 114 in substantially normal relation to the latter. The ends 116—116 of the arms 115—115 are secured to a rod 117 disposed above the plate 69 in spaced relation to the plate. The rod 117 is pivotally mounted within blocks 117a (Fig. 7) secured to the plate 69 and is connected at its ends by links 118—118 to an arm 119 which is disposed in contact with the rolls 112. The weight of the links 118—118 and arm 119 maintains normally the clamping element 113 in spaced superposed relation to the work as shown in Figs. 10 and 17. In my preferred device the plate 69 has grooves or slots 120 (Figs. 8, 15, and 25) disposed in underlying relation to the arms 115—115 of the clamping element and adapted to cooperate with the arms when the latter are in clamping position. Movement is imparted to the clamping mechanism by the cam 121 keyed to the cam shaft 85 on the other side of the feed cam housing 56 from the gear housing 92. A pair of spaced brackets 122—122 are secured to the rod 105 of the clamping mechanism and hold a roll 123 between them. The roll 123 is normally in engagement with the flat 124 of the cam 121 as most clearly shown in Fig. 10. Rotation of the cam 121 brings the high point 125 of the cam into engagement with the roll 123 which lifts the rods 104 and 105 which in turn raise the slide blocks 110 to impart motion to the clamping arms 115—115 in the direction of the work.

The operation of my machine is as follows: The electric motor for rotating the belt is started. The work 2 which may be in the form of a garment is placed against the gage stops 82 on the plate 69 as shown in Fig. 8. The foot switch 17 shown on the wiring diagram in Fig. 23 is depressed which actuates the electrical timing device 11 which in turn energizes the solenoid 12. The solenoid acts on the rod 18 to engage the clutch 19 to set the machine in operation. As there are three fasteners to be attached in the machine hereinabove described, the timing device energizes the solenoid to cause the clutch to engage for three complete revolutions of the drive shaft 16. At the end of the third revolution rotation of the drive shaft is instantly stopped by a constant friction brake mechanism 16a (Fig. 3), since the disengagement of the clutch removes the force tending to override the constant friction braking action of the brake mechanism. The upper and lower setting tools with their respective feed mechanisms are correlated with the drive shaft to set one fastener on the work during each revolution of the shaft. The driving gear 93 for the spacing mechanism rotates with the driveshaft and imparts motion to the feed cam 83 through the chain of gears 94—98 in the ratio of the revolution of the feed cam to three revolutions of the drive shaft.

Having reference to the cam path illustrated in Fig. 26 and the schematic views Figs. 27-29, the setting tools set one fastener A (Fig. 27) in the work during the first rest 87a. Before the setting tools have come together to secure the fastener A the cam 121 will have rotated sufficiently to engage the high point 125 of the cam 121 with the roll 123 raising the arms 104 and 105 and thus moving the clamping element 113 against the work 2 (Fig. 10). In this clamping operation the work is held by the operator somewhat taut across the slots until the arms 115—115 of the clamping element force the work into the slots 120 as shown in Fig. 15, so as to hold the work firmly and stretch the same tightly over the corners of the openings and thereby prevent wrinkling or puckering of the material during the setting operation. When the cam roll 89 reaches the throw 88a motion will be imparted to the table 70 through the cam stem 90 to move the plate 69 carrying the work 2 to the second attaching position. The distance between the attaching positions has been predetermined and the feed cam path layed out in accordance with the desired indexing. During the second rest 87b the setting tools will come together to set the second fastener B (Fig. 28). It will be understood that during all the setting operations the holes 80a, 80b, 80c of the plate 69 will be indexed properly with respect to the lower setting tool 9 to allow the same to come through the respective openings for setting cooperation with the upper setting tool. In the second throw 88b the table will again be advanced to move the work 2 to position for the third fastener C which is set during the third rest 87c (Fig. 29). The third throw 88c imparts return movement to the table 70 which brings the work-supporting plate 69 into its original position. Simultaneously with the end of the return of the plate 69, the cam 121 will have completed its revolution and the cam flat 124 will have been brought into engagement with the roll 123 (Fig. 10) to release the clamping element 113 so as to permit the work to be removed.

In Figs. 33-39 I have illustrated a modified form of feed cam which is operable with the mechanisms described above in connection with the first form of my device. The object of my modified form is to provide a method of attaching two series of three fasteners to a work in one revolution of the feed cam. This is accomplished by laying out a cam track which will effect an intermittent movement of the plate-carrying table on its outward reciprocatory motion and an intermittent movement on its return reciprocatory motion. The electrical and mechanical mechanisms of the machine to which my modified cam feed is adapted are correlated in a way to cause the feeding, setting, and spacing mechanisms to stop automatically at the end of the outward motion of the work table so as to permit another work to be set in place prior to starting the machine again to effect the return motion. Further it will be understood that in order to bring about proper correlation of the setting and feeding mechanisms with the modified feed cam, it is necessary to change the ratio of the drive gear for the spacing mechanism and the drive gear for the feed cam from 3–1 to 6–1 proportion.

Referring to Fig. 33 I have shown my modified feed cam 126 having the track 127 for receiving a roll cam 68a which imparts motion to the table 128 and plate 129 carrying a work 130 in the manner described in connection with my first form of feed cam and roll cam illustrated in Fig. 26. The track 127 has a series of five rests 131a, 131b, 131c, 131d, and 131e and four throws 132a, 132b, 132c, and 132d. In operation of the machine the solenoid is energized through a time switch to engage the clutch which sets the main drive shaft in motion. During the first rest 131a the first fastener D (Fig. 34) is set. The work table is moved to the second attaching position on the first throw 132a and in the second rest 131g the fastener E (Fig. 35) is set. The work table is moved to the third attaching position on the throw 132b and in the first half of the rest 131c the fastener F (Fig. 36) is attached. At this point the work table has completed its outward reciprocating motion and the operating mechanism automatically stops. After the work 130 bearing the three fasteners is removed another work 133 is placed in position on the plate 129. In starting the machine again the fastener G will be set during the second half of the rest 131ᶜ and the throw 132ᶜ will impart motion to the table 128 toward return position. On the rest 131ᵈ the fastener 14 is set and on the throw 132ᵈ the table is moved to its original position represented by the rest 131ᵉ which is a continuation of the rest 131ᵃ. The fastener I is attached during the rest 131ᵉ and the machine automatically shuts off for removal of the work.

In Figs. 40 to 49 of the drawing I have shown views of a modified form of spacing mechanism which is operable to throw the spacing mechanism out of action when it is desired to set fasteners singly rather than in a series. My modified form of spacing mechanism is an improvement over the first form illustrated and described in Figs. 1–25 because while the latter has worked well commercially to attach three fasteners in series it is not completely efficient for attaching a single fastener as may be necessary when it is desired to replace one fastener of the series which has not been attached properly. Thus in operating my first form of machine for single attachment the timing switch is set on single position so as to actuate engagement of the clutch for one revolution while a single fastener may be set efficiently, the table is caused to move following the setting which interferes with a second single setting in the same reciprocatory sequence only of the main driveshaft. My improved form hereinafter described is operable in both single and multiple attachment from a single setting position of the timing device with a manually operable lever provided for automatically changing the operation from single to multiple action through a novel clutch arrangement. Automatic means is also correlated with my modified spacing mechanism to energize the solenoid device for effecting the multiple attachment when the lever has been set for multiple operation of the mechanisms.

Referring to Figs. 40 and 41 I have provided in my modified form an adjustable drive gear 133 which is keyed to the main drive shaft 134. A hand wheel 135 (Fig. 41) disposed outside the gear casing 136 is keyed to the drive shaft 134 for manual turning of the same when desired. The drive gear 133 meshes with an idler gear 137 which in turn meshes with another idler gear 138. The gear 138 provides a pinion 139 which meshes with the idler gear 140 which is geared to the cam shaft-driving gear 141. The gear 141 rotates freely around the center bushing 142 maintained in assembly with the cam shaft 143 by the nut 142ᵃ. The shaft 143 operates to turn a feed cam (not shown) similar to the cam 83 of my first form which has been described. A clutch plate 144 is secured to the side 145 of the gear 141 facing outwardly from the machine. The clutch plate provides three openings 146 at intervals of 120° for cooperation with the clutch member 147 as will be described. The clutch member 147 has a face plate 148 and a sleeve portion 149 which is splined to the cam shaft 143 by the keys 150 as most clearly shown in Fig. 40. Three pins 151 disposed at spaced intervals of 120° extend from the plate 148 for engagement within the openings 146 of the clutch plate when the clutch is engaged. Each of the pins 151 has a taper 152 at its leading end to insure that the clutch will be cammed out of engagement with the clutch ring should the parts by accident be only partially engaged as illustrated in Fig. 49. Secured to the outer wall of the gear casing 136 is a locking plate 153 having an opening 153ᵃ receiving an end of the cam shaft 143 and an opening 154 (Figs. 41 and 45) disposed in aligned relation with a locking pin 155 extending from the clutch sleeve 149. In disengaged position of the clutch the pin 55 is received within the opening 154 of the plate 153.

Engagement and disengagement of the clutch is effected by the lever 156 which is pivotally secured to the gear casing at its end 157 and provides a finger gripping portion 158 at its opposite end which projects through an opening 159 of the casing. The lever 156 is connected to the clutch sleeve 149 by a roll 160 secured to the inner surface of the lever by a screw 161 and disposed within a slot 162 of the clutch sleeve as most clearly shown in Fig. 44. The lever is maintained in either engaged or disengaged position by a tensioned ball 163 which is assembled within the gear casing and which cooperates with depressions 164 and 165 formed in the lever in the respective engaged and disengaged positions of the clutch.

To move the clutch from engaged position shown in Fig. 41 to disengaged position, the lever 156 is moved to the right. This movement operates through the roll 160 to slide the clutch member 147 toward the locking plate 153 to engage the pin 155 in the opening 154. At the same time the pins 151 will be drawn from the openings 146 in plate 144. At the end of the disengaging action the ball 163 will snap into the depression 165 to hold the clutch in disengaged position.

The work-carrying plate 166 is secured to a table 167 which slides on ball bearings 168 between the guides 169 positioned within a channel 170 of the frame 171 in the manner of the mechanism of the first form of my invention. The clamping mechanism 171ᵃ (Fig. 40) of my present form is similar to that operating with my first form and need not be described in detail. As seen in Fig. 46, however, the bar 172 which is the equivalent of the bar 105 of my first form, so far as its functions with respect to the clamping elements are concerned, operates not only to raise the slide block 173, but provides an extension 172ᵃ projecting through and beyond the opening 174 of the slide block into contact with the roll 175 of the make-and-break switch 176. The switch 176 is tied in with a solenoid device operating in the manner of that described in connection with my first form, and the switch provides contacts 177 and 178 which when closed complete a circuit re-energizing the solenoid as shown in Fig. 48 to engage the clutch with the drive shaft, in the manner of my first form, for one revolution of the main drive shaft.

The bar 172 is actuated to operate the clamping mechanism (shown in part only) and the switch 176 by the cam 179 keyed to the cam shaft 143. The cam 179 engages a roll 180 supported between brackets 181—181 secured to the bar 172. In inoperative position of the work-supporting plate 166 the flat 182 of the cam 179 is in engagement with the roll 180, but rotation of the cam shaft operates to bring the high point 183 of the cam into engagement with the roll to actuate the clamping mechanism and also close the circuit connecting the switch 176 with the solenoid.

In operating my present form of attaching mechanism to set a single fastener the clutch plate 144 and clutch member 147 are disengaged by moving the lever 156 to the right as described. With the clutch disengaged the drive gear 141 rotates freely on the the bushing 142 and the spacing mechanism is inoperative. When it is desired to set automatically 3 fasteners in series the lever 156 is moved to the left from disengaged position. By this action the sleeve 149 is moved along the shaft 143 with the result that the pins 151 mesh within the openings 146 of the clutch plate 147 thereby engaging the clutch to enable the gear 141 to turn the cam shaft. For the first fastener setting the solenoid is energized to engage the main clutch (not shown) for one revolution of the main drive shaft (not shown) through the time switch (not shown). During this setting operation engagement of the high point 183 of the cam with the roll 180 lifts the bar 172 to close the switch 176 which energizes the solenoid to effect the second and third fastener settings. It is of course understood that the same ratio of three revolutions of the main drive shaft to one revolution of the cam shaft exists in this modification as in my first form with resulting correlation of the feeding and setting mechanisms to effect three fastener attachments during one revolution of the feed cam.

Although I have illustrated and described preferred embodiments of my invention, I do not wish to be limited thereby because the scope of my invention is best defined by the following claims.

I claim:

1. In a fastener attaching machine, fastener setting mechanism, a workholding plate movable reciprocally with relation to said fastener setting mechanism, spacing mechanism for imparting intermittent movement to said workholding plate in at least one direction of its reciprocating movement, clamping means for clamping an article to said workholding plate and releasing the same, said fastener-setting mechanism being operable to attach a fastener to a work at each rest in said intermittent movement of said plate, means acting to synchronize said fastener-setting mechanism and said spacing mechanism to attach automatically to a work a predetermined number of fasteners during the course of said intermittent movement of said work-holding plate, means synchronizing said clamping means with said spacing mechanism whereby said clamping means operates to clamp a work to said plate at the beginning of said intermittent movement and release said work at the end thereof.

2. A device for a fastener attaching machine having mechanism for setting fastener members, said device including a frame having a guide, a table movable reciprocally in said guide, a workholding plate mounted on said table, a drive shaft, a cam carried by said drive shaft and operably associated with said table in a way to transmit an intermittent movement in at least one direction of its reciprocal movement, a clamping means operable to clamp a work to said worktable, a second cam carried by said drive shaft and synchronized with said first cam to actuate said clamp into clamping position at the beginning of said intermittent movement and release said clamp at the end of said movement.

3. A device for a fastener attaching machine having mechanism for setting fastener members, said device including a plate laterally movable to a plurality of fastener setting positions and having an upper surface for supporting a work to which fasteners are to be set, said plate having a plurality of spaced fastener applying stations and spaced depressions in said upper surface disposed adjacent opposite outer ends of said spaced stations, and a clamping device having bars for holding said work against said plate when said bars are in clamping position, and portions of said bars being disposed opposite said depressions in clamping position of said device to force said work into said depressions, when held substantially tautly across said depressions, to stretch and hold securely said work in non-wrinkling state during a fastener setting operation.

4. In a fastener attaching machine, upper and lower fastener-setting tools, a main drive shaft for actuating said tools, a solenoid device correlated with said main drive shaft to initiate rotation of the same, a switch tied in electrical connection to said solenoid for effecting initiation of electrical impulses to energize said solenoid for one revolution of said main drive shaft, a workholding plate mounted between said tools and movable reciprocally relative thereto, spacing mechanism for imparting reciprocal movement to said workholding plate with said movement being intermittent in at least one direction, means acting to synchronize said fastener setting and said spacing mechanism to secure automatically to a work a predetermined number of fasteners during the course of said intermittent movement of said workholding plate, a second switch tied in electrical connection with said solenoid and operable when closed to initiate electrical impulses to energize said solenoid for effecting a revolution of said drive shaft succeeding said first, and means correlated with said spacing mechanism for closing said latter switch upon operation of said spacing mechanism.

5. In a fastener attaching machine, upper and lower fastener-setting tools, a main drive shaft for actuating said tools, a solenoid device correlated with said main drive shaft to initiate rotation of the same, a switch tied in electrical connection to said solenoid for effecting initiation of electrical impulses to energize said solenoid for one revolution of said main drive shaft, a workholding plate mounted between said tools and movable reciprocally relative thereto, a second drive shaft, a cam carried by said second drive shaft and operably associated with said table in a way to transmit an intermittent movement in at least one direction of its reciprocal movement, a second switch tied in electrical connection with said solenoid and operable when closed to initiate electrical impulses to energize said solenoid for effecting a revolution of said main drive shaft succeeding said first, and means actuated by rotation of said second drive shaft for closing said second switch.

6. In a mechanism for automatically shifting a workpiece for attachment of a predetermined number of fasteners separately at predetermined spaced positions on the workpiece, a workpiece supporting table reciprocating back and forth in said mechanism, table actuating means including a power operated rotatable shaft and connections between said shaft and table including a cam for shifting the table to the next position and for stopping the table for a predetermined time at such position upon each complete rotation of said shaft, a brake applying constant friction to resist rotation of said shaft, a clutch controlling rotation of said shaft, a clutch controlling member normally held in position for disengaging said clutch, control means for moving said clutch controlling member to clutch engaging position, and an automatic means for rendering said control means ineffective upon completion of a predetermined number of rotations of said shaft to permit disengagement of said clutch, said brake stopping rotation of said shaft upon disengagement of said clutch.

GEORGE D. PICKERING.

References Cited in the file of this patent

UNITED STATES PATENTS

| Number | Name | Date |
|---|---|---|
| 222,568 | Bray | Dec. 16, 1879 |
| 729,825 | Whittemore | June 2, 1903 |
| 832,606 | Glass | Oct. 9, 1906 |
| 899,324 | Riggs | Sept. 22, 1908 |
| 995,050 | Ambler | June 13, 1911 |
| 1,136,166 | Prime | Apr. 20, 1915 |
| 1,217,521 | Snyder | Feb. 27, 1917 |
| 1,375,889 | Baltzley | Apr. 26, 1921 |
| 1,486,979 | Mackenzie | Mar. 18, 1924 |
| 1,735,643 | Henry | Nov. 12, 1929 |
| 1,773,511 | Bauwens | Aug. 19, 1930 |
| 2,461,889 | Fossa | Feb. 15, 1949 |